R. WERKNER.
CONTROLLING DEVICE FOR VEHICLES.
APPLICATION FILED JAN. 14, 1908.
927,014.
Patented July 6, 1909.
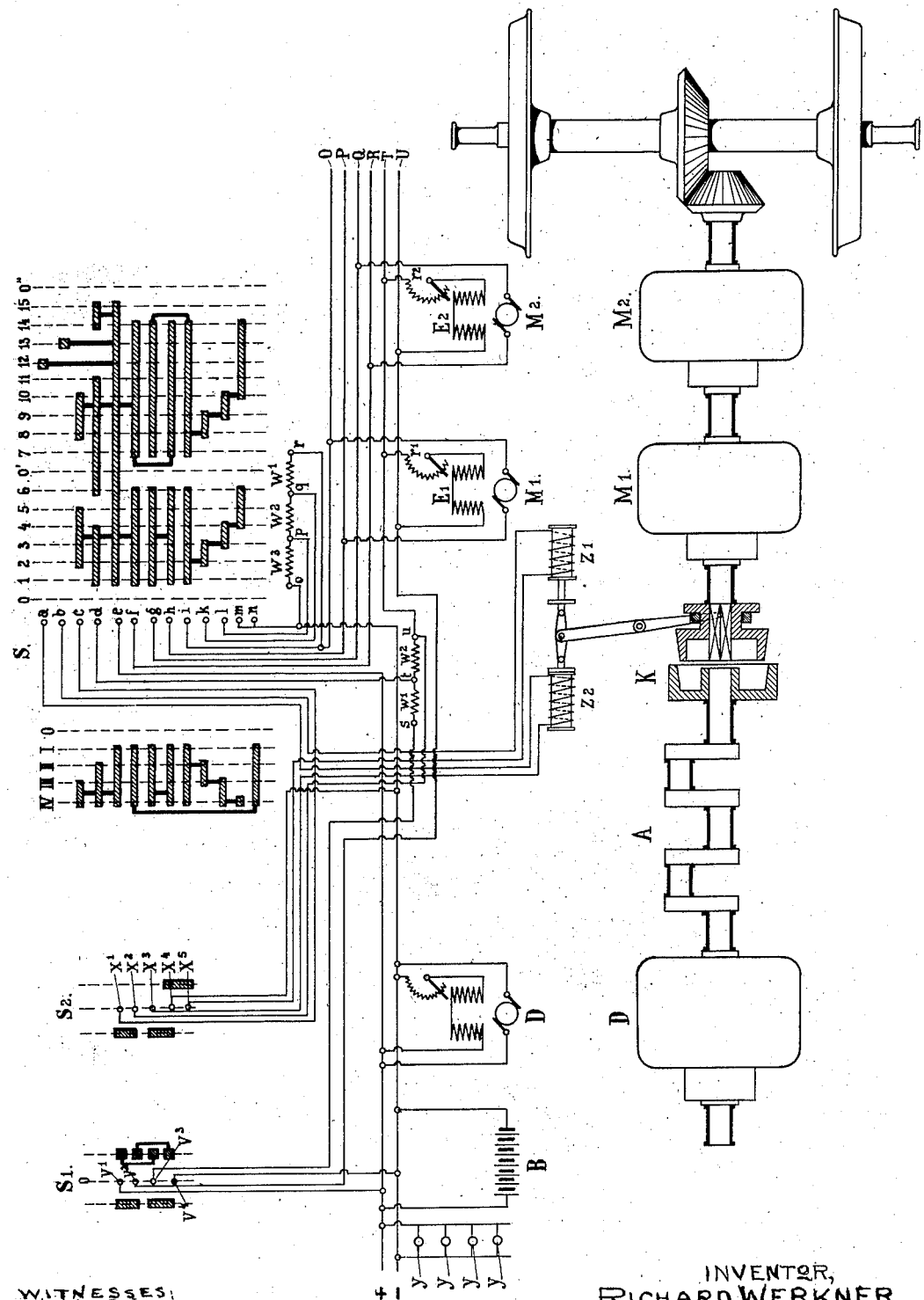
WITNESSES:
INVENTOR,
RICHARD WERKNER,
by van Oldeneel & Schoenlank
ATTORNEYS.

UNITED STATES PATENT OFFICE.

RICHARD WERKNER, OF BUDAPEST, AUSTRIA-HUNGARY.

CONTROLLING DEVICE FOR VEHICLES.

No. 927,014.      Specification of Letters Patent.      Patented July 6, 1909.

Application filed January 14, 1908. Serial No. 410,773.

*To all whom it may concern:*

Be it known that I, RICHARD WERKNER, a subject of the King of Hungary, residing at Budapest, in the Kingdom of Hungary, have invented new and useful Improvements in or Relating to Controlling Devices for Vehicles, and I do hereby declare the following to be a full, clear, and exact description of the same.

My invention relates to an electric controlling device for vehicles which are driven when running at normal speed direct by a heat engine, while the driving with reduced or increased speed is obtained by means of electric motors supplied with energy by a dynamo connected to the heat engine, and by a buffer battery.

The electric controlling device according to this invention is intended to make possible gradual increase and reduction of the speed of traveling, while the heat engine, independently of the speed or of the complete stoppage of the vehicle, is running the whole time with uniform speed and uniform load, and during the greater portion of the journey drives the vehicle direct. In that way the heat engine can constantly work with the most favorable cut-off or with the best gas mixture, and the losses of energy combined with the conversion of energy are reduced to a minimum by the chiefly direct mechanical driving.

The device according to this invention can be used for vehicles of any kind, as for instance, street vehicles, railway vehicles, ships: the accompanying drawings illustrating a form of construction applied to railway vehicles.

The drawing shows the general arrangement of the mechanical device and above the same the diagram of the connections of the controlling device.

A represents, for instance, the double cranked driving shaft of the heat engine, D the dynamo connected to it, K a clutch which can be electrically thrown in or out of gear and by means of which the shaft of the heat engine can be connected direct to the spindle of the electric motors $M^1$ $M^2$ connected to a wheel axle by means of any desired gear (in the drawing by means of a bevel wheel gear). The arrangement can be varied in various ways without departing from the spirit of the invention.

As will be seen from the diagram of connections, the dynamo D is shunt wound and connected in parallel to an accumulator battery B. When the consumption of current by the motors is normal the current is supplied by the dynamo alone, when the consumption is greater, for instance at starting, the current is supplied by the dynamo and the battery together. When the consumption of current is very small, or none at all, for instance when the speed of traveling is reduced and during stoppages, the battery B is charged by the excess of energy of the heat engine by means of the dynamo D, and during the braking, before the stopping and on downgradients, the electric motors, acting as generators, in as far as they are shunt machines, can also give off their energy to the battery in the form of charging current. After direct connection of the heat engine to the wheels, the battery with the dynamo acts in the well known manner as an equalizer, since when the resistance to driving is small, the battery is charged, and when the resistance to driving increases the current is discharged therefrom.

Owing to the hereinbefore described coöperation of the heat engine, dynamo, accumulator battery and electric motors, the heat engine is made to work always with the uniform number of revolutions and with uniform medium load, whereby the best efficiency is obtained.

The diagram of connections illustrated refers to a case in which shunt motors are used, the number of revolutions being regulated by switching resistance into the armature circuit and into the exciter circuit, as well as by series parallel switching of the armatures. These methods of regulations can, however, be used also singly, or in some other combination, or some other methods of regulation could be used.

As shown in the diagram of connections for two motors $M^1$, $M^2$, the armature circuits of the motors (any desired number of which can be provided) are connected to the through wires O and P or Q and R. The exciter circuits $E^1$ $E^2$ of the motors are connected by separate wires T and U in parallel to the dynamo and to the battery. Each motor receives a separate adjustable shunt resistance of its own, marked $r^1$, $r^2$, for obtaining a uniform distribution of the load, and moreover, the exciter wire T of the motors is provided with joint regulation resistances —$W^1$, $W^2$—. The small switch $S^1$ is intended for reversing the direction of driving. In its zero position (shown in the drawing) the exciting circuit for the motors is switched out, while in the position on the right hand side corresponding to "forward" the exciter current flows through the excited windings in one direction, and in the left-hand position which corresponds to "backward" in the other direction, so that, while the direction of the armature current remains the same, it causes the motors to rotate in the desired direction. Resistances which can be switched into the armature circuit in any desired number, are marked $W^1$, $W^2$, $W^3$.

If the main driving switch S is brought into the position 1, and the driving switch $S^1$ into the position corresponding to "forward", then only the resistance —$w^2$— will be switched into the exciter circuit by the circuit

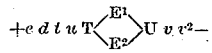

while the resistance —$w^1$—will be short-circuited over $t\ d\ e\ v^1\ v^3\ s$, whereby the excitation of the motors will be increased. In the main circuit the circuit $+ef\ R\ M^2\ Q\ g\ h\ P\ M^1\ O\ r\ q\ p\ o$ will at the same time switch the armatures in series with each other, and with the resistances $W^1$, $W^2$, $W^3$. In the positions 2 3 4 of the switch S, the resistances $W^1$, $W^2$, $W^3$ are consecutively short-circuited, and the speed thus increased. For the purpose of still further increasing the speed, in the position 5 the connection—$d$, $e$—in the driving switch is broken, and thus the resistance —$w^1$— is switched into the exciter circuit by the circuit

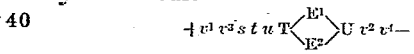

whereby the excitation is reduced. Then in the position 6 the resistance —$w^1$— is again short-circuited (the connection —$d$, $e$— again reëstablished, exciter circuit as in the positions 1–4) whereby the exciting is increased and owing to the high speed obtained from the former positions of the switch, the current can be cut off from the motors so that on passing into the position $O^1$, the main circuit is switched out without sparking. In the position 7, with the same exciter circuit, the armatures are switched in parallel by the circuit

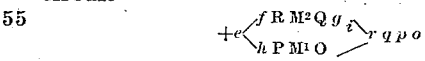

the resistances $W^1\ W^2\ W^3$ being switched in. Thereupon in the positions 8, 9, 10 the resistances $W^1\ W^2\ W^3$ are consecutively short-circuited and thus the speed still further increased. The position 11 produces during the driving the same connection as the position 10, and is used only in braking. In the position 12, the resistance —$w^1$— is again switched into the exciter circuit (exciter circuit the same as in the position 5) and thus a further increase of the speed of traveling is obtained. The resistance —$w^1$— must be of such size that, by switching it in, the spindle connected to the electric motors should receive exactly the same number of revolutions as that of the spindle connected to the heat engine, so that the two spindles could then be connected without any shocks. This takes place on passing into the position 13 by the solenoid $Z^1$ receiving current and, by attracting its iron core, throwing the clutch into gear by means of a system of levers. The switch $S^2$ must then be in the right hand or "driving" position (circuit $+e\ b\ Z^1\ x^5\ x^4$—). After the throwing into gear of the clutch, the latter is maintained in its position by well known mechanical auxiliary means. When passing into the position 14, the circuit of the solenoid $Z^1$ is broken by separating the connection $e\ b$, and the resistance —$w^1$— in the exciter circuit is again short-circuited by reëstablishing the connection $e\ d$. In that way the exciting is increased, so that, owing to the high number of revolutions after the throwing into gear of the clutch, the current is cut off from the motors, and the work of the heat engine is transmitted mechanically direct through the clutch. Then by passing into the position 15 the main circuit can be switched out without sparking, so that in the position $O''$ the exciter current can be weakened by the switching in of the resistance —$w^1$, and by moving the switch $S^1$ into the zero position, interrupted altogether.

If it is desired to disconnect the coupling before stopping and then to apply the brakes, the switch $S^1$ is put into the right hand position corresponding to "forward", and the switch $S^2$ into the left hand position corresponding to "brake". (The latter can also be effected automatically by reversing the direction of rotation of the driving switch S, for instance, by means of a ratchet gear). By passing from the position $O''$ into the position 15, the excitation is increased, and then, in the position 14, the main circuit is switched in without sparking. In the position 13 the resistance —$w^1$— is switched in and thus the exciting and the consumption of current by the motors are reduced, whereby the work is transmitted from the heat engine to the electric motors. The clutch can then be thrown out of gear without mechanical or electric shock. In the position 12 the solenoid $Z^2$ receives current (circuit $+e\ a\ Z^2\ x^3\ x^4$—) and throws the clutch out of gear, the said clutch being then held fast in the disconnected position by auxiliary mechanical means. In the position 11, the circuit of the coil $Z^2$ is broken, and the resistance —$w^1$— in the exciter circuit short-circuited. In that way the exciting is increased, and the current cut off from the motors as before in the position 14. In the position 10 the resistance —$w^2$— in the exciter circuit is also short-circuited by the circuit $$+e\ cx^1 x^2 u\ T {<}^{E^1}_{E^2}{>} U\ v^2 v^4-.$$

In that way an electric brake is applied, since the motors which act as generators when the excitation is increased, supply charging current to the battery. With the reduction of the traveling speed, the strength of the braking current decreases, and in the next positions 9, 8, 7 is still further decreased by the insertion of the resistances $W^1$, $W^2$, $W^3$, into the main circuit. In the position 7, the exciting is also reduced by the switching in of the resistance —$w^3$— into the exciter circuit, so that by passing into the position $O^1$, the braking current is cut off without sparks. In the position 6 the passage to the series-switching of the motors takes place. In the position 5 the resistance —$w^3$—, and in the position 4 also the resistance —$w^1$—, are switched out from the exciter circuit, whereby the excitation is increased, and the brakes further applied with reduction of speed. With the decreasing speed is combined a reduction of the braking current, but the said speed is also further reduced in the next positions 3, 2, 1 by the switching in of the resistances $W^1$, $W^2$, $W^3$ into the main circuit and by the reduction of the exciting in the position 1 by switching in the resistance —$w^2$— into the exciter circuit, and finally cut off without sparking in the position O.

Before stopping, a short-circuit braking can be applied, the switch being moved beyond the position O, into the left-hand position equivalent to "brake." At the brake position I, the armatures of the motors are connected to each other and to the resistances $W^1$ $W^2$ $W^3$ in series, in the following local circuit $M^2$ Q $g$ $h$ P $M^1$ O $r$ $q$ $p$ $o$ $n$ $f$ R $M^2$. At the next braking positions II, III, IV, the resistances —$W^1$ $W^2$ $W^3$ are short-circuited consecutively, and the exciting increased by short-circuiting the resistances —$w^1$, $w^2$—

$$\text{circuit} +e\ c\ x^1 x^2 u\ T{<}^{E^1}_{E^2}{>} U\ v^2 v^4-.$$

As soon as the short-circuiting current of the armatures has decreased to a corresponding extent, the short-circuiting current is cut off without sparking by moving back over the positions III, II, I, into the position O. By bringing the switch $S^1$ into zero position, the exciter circuit is also cut off and the vehicle is stopped entirely by some other, for instance, mechanically acting brake.

If, by way of exception, it is desired to travel with greater speed than the normal, then, by using electric transmission of force, by inserting a further resistance into the exciter circuit, the exciting of the motors can be still further reduced, and thus the speed increased, or the accumulator battery can be switched out, and the pressure of the dynamo increased by increasing its excitation, whereby the motors will also be caused to rotate at a greater speed.

If the above described controlling device or controller is used for driving motors of a single vehicle, the motor spindles, or the road wheels connected to them, should be connected in well known manner by rods or gears, for the purpose of positively insuring the same number of revolutions of the motors. By correspondingly adjusting the separate shunt resistances —$r^1$, $r^2$— of the motors, any differences in the magnetic circuits of the shunt motors, switched in parallel can be equalized and thus the load distributed in uniform manner on the single motors.

If the controlling gear is not to be used for single vehicles but for whole trains, then the switch positions shown in the diagram of connections, can be effected by means of one single driving switch for all the motors, arranged on the vehicle containing the heat engine, dynamo and accumulator battery, while the wires O, P, Q, R are intended for alternately connecting the armatures, and the wires T U for connecting all the exciter windings of the motors distributed on the trailer cars, and are guided along the whole of the train. The arrangement can, however, be made in such manner, that only two through high-pressure wires are carried along the train, and one of the well-known multiple controls is used, in which each vehicle obtains separate switches controlled by a controller switch from the leading vehicle by means of wires.

In order to obtain a uniform distribution of current of the single motors guided in parallel, on the trailer cars, the shunt resistances —$r^1$, $r^2$— must be adjusted in such manner that in case of an excessively high load on a motor, its exciting is increased, and thus the strength of its armature current reduced, while in the case of an excessively small load on a motor, its exciting is reduced, and thus the strength of the armature current increased. This of course can also be automatically effected by a shunt regulator controlled by the armature current, or the shunt motors could be provided with additional series field windings by means of which the exciting increases or decreases with the strength of the current, and consequently the strength of the armature current is reduced or increased. This series field winding must however, in order to act properly, be reversed at each change of direction of current, and therefore also when braking.

In principle, this control can also be applied to series wound motors. In series motors as well, after the coupling is thrown into gear, the exciting of the motors can be increased, with which is connected a relief of the motors and a direct loading of the heat engine.

This increase of exciting can be effected in the case of series motors by switching out resistance previously connected in parallel to the field winding, or by switching in series the coils of the field winding previously connected in parallel. A complete unloading of the series motors, or switching them out in currentless state, is however impossible, because a reduction of exciting is combined with the reduction of the armature current. The application of the controller according to this invention to series motors has, moreover, the disadvantage that the braking by charging the battery when the exciting is increased, cannot be carried out, and that, owing to the number of revolutions being dependent on the load, the same number of revolutions of the motor spindle and of the spindle of the heat engine cannot be obtained as exactly as in shunt motors by means of a given position of the driving switch, but must be determined before the throwing into gear of the clutch, by some speed measuring device.

When using the controlling device hereinbefore described, the vehicles can also be electrically lighted, the lamps —y— being connected to the wires which are carried from the dynamo or from the battery through the vehicles and supplied with constant pressure. The battery can then be arranged either in the front vehicle or distributed in elements over the single trailer cars.

Having described my invention what I claim is:—

1. In combination with a vehicle, a heat engine, an electric generator coupled with said heat engine, a storage battery and means for connecting the same in parallel with said generator, shunt wound electric motors coupled with the vehicle wheels and means for supplying said motors with current from said generator and battery, an engaging and disengaging gear for connecting the heat engine and the vehicle wheels, and means for regulating the exciting of the motors to equalize the speed of the engaging parts of said engaging and disengaging gear before actuating this latter.

2. In combination with a vehicle, a heat engine, an electric generator coupled with said heat engine, a storage battery and means for connecting the same in parallel with said generator, shunt wound electric motors coupled with the vehicle wheels and means for supplying said motors with current from said generator and battery, an engaging and disengaging gear for connecting the heat engine and the vehicle wheels, means for equalizing the speed of the engaging parts of said engaging and disengaging gear before actuating this latter, and means for regulating the excitation of the motor before breaking the main current to insure by the electromotive counterforce a sparkless switching out of the motors.

3. In combination with a vehicle, a heat engine, an electric generator coupled with said heat engine, a storage battery and means for connecting the same in parallel with said generator, shunt-wound electric motors coupled with the vehicle wheels and means for supplying said motors with current from said generator and storage battery, an engaging and disengaging gear for connecting the heat engine and the vehicle wheels, means for regulating the exciting of the motors to equalize the speed of the engaging parts of said engaging and disengaging gear before actuating this latter, and means for also regulating the excitation of the motors before breaking the main current in a way to insure by the electromotive counterforce a sparkless switching out of the motors.

In testimony whereof, I have signed my name to this specification in the presence of two subscribing witnesses.

RICHARD WERKNER.

Witnesses:
 EUGÈNE HERMANN,
 CHARLES MESSINGER.